United States Patent
Ohsuge

(10) Patent No.: US 7,315,733 B2
(45) Date of Patent: Jan. 1, 2008

(54) ANTENNA-SWITCHING DIVERSITY RECEIVER CAPABLE OF SWITCHING ANTENNAS WITHOUT DETERIORATION OF RECEPTION CHARACTERISTIC EVEN WHEN APPLIED TO THE CDMA COMMUNICATION METHOD

(75) Inventor: Michihiro Ohsuge, Minato-ku (JP)

(73) Assignee: NEC Corporation, Tokyo (JP)

(*) Notice: Subject to any disclaimer, the term of this patent is extended or adjusted under 35 U.S.C. 154(b) by 528 days.

(21) Appl. No.: 11/033,721

(22) Filed: Jan. 13, 2005

(65) Prior Publication Data

US 2005/0153673 A1 Jul. 14, 2005

(30) Foreign Application Priority Data

Jan. 14, 2004 (JP) ............................ 2004-006853

(51) Int. Cl.
H04B 1/06 (2006.01)
H04B 7/00 (2006.01)
(52) U.S. Cl. .............................. 455/277.1; 455/277.2; 455/272; 455/134; 455/140; 375/347
(58) Field of Classification Search ............. 455/277.1, 455/277.2, 272, 133–136, 140, 226.1–226.3; 375/347
See application file for complete search history.

(56) References Cited

U.S. PATENT DOCUMENTS

| | | | | |
|---|---|---|---|---|
| 5,203,024 A * | 4/1993 | Yamao | ........................ | 455/133 |
| 5,369,801 A * | 11/1994 | Smith | ........................ | 455/277.1 |
| 5,530,926 A * | 6/1996 | Rozanski | ................... | 455/277.2 |
| 5,960,046 A * | 9/1999 | Morris et al. | ................ | 375/347 |
| 6,032,033 A * | 2/2000 | Morris et al. | ............. | 455/277.2 |
| 6,212,368 B1 * | 4/2001 | Ramesh et al. | ........... | 455/277.2 |
| 6,317,424 B1 * | 11/2001 | Euscher | ........................ | 370/350 |
| 6,327,481 B1 * | 12/2001 | Nagashima | ................. | 455/562.1 |
| 6,738,439 B1 * | 5/2004 | Okanoue et al. | ............. | 375/347 |
| 6,763,011 B1 * | 7/2004 | Hakkinen et al. | ............ | 370/337 |
| 6,778,815 B1 * | 8/2004 | Enoki | ........................ | 455/277.2 |
| 6,847,810 B2 * | 1/2005 | Shen et al. | ............... | 455/277.2 |
| 6,947,716 B2 * | 9/2005 | Ono | ............................ | 455/273 |
| 7,020,122 B1 * | 3/2006 | Hirai et al. | .................. | 370/342 |
| 2003/0026366 A1 * | 2/2003 | Matsui et al. | ................ | 375/347 |
| 2003/0067970 A1 * | 4/2003 | Kim | ............................ | 375/148 |

FOREIGN PATENT DOCUMENTS

| | | |
|---|---|---|
| GB | 2360911 A | 10/2001 |
| JP | H11-055168 | 2/1999 |
| JP | 2002-300096 | 10/2002 |

* cited by examiner

Primary Examiner—Edward F. Urban
Assistant Examiner—RuiMeng Hu
(74) Attorney, Agent, or Firm—Sughrue Mion, PLLC

(57) ABSTRACT

An antenna-switching diversity receiver is capable of switching antennas without bringing about deterioration of reception characteristics even when applied to the CDMA communication method. A TFCI bit decoding/determination unit decodes TFCI bits that have been extracted by a TFCI bit extractor and determines the presence or absence of communication control data based on the TFCI bits that have been decoded. An antenna switching control unit uses a timer to check for the presence or absence of communication control data in each of fixed time intervals based on the determination results of the TFCI bit decoding/determination unit and then controls the antenna switch in intervals that lack communication control data to measure the reception level of the common pilot channel at the other antenna that differs from the antenna that is currently receiving and then select the antenna having the higher reception level.

4 Claims, 3 Drawing Sheets

ANTENNA-SWITCHING DIVERSITY RECEIVER CAPABLE OF SWITCHING ANTENNAS WITHOUT DETERIORATION OF RECEPTION CHARACTERISTIC EVEN WHEN APPLIED TO THE CDMA COMMUNICATION METHOD

BACKGROUND OF THE INVENTION

1. Field of the Invention

The present invention relates to a diversity receiver that is provided with two antenna systems and an antenna switch for switching between these two antenna systems, and more particularly to an antenna switching control method in a diversity receiver for implementing control to switch to, of the antennas of the two systems, the antenna having the better reception state.

2. Description of the Related Art

In recent years, the CDMA (Code Division Multiple Access) communication method, which can overcome interference and obstructions, has received attention as a communication method for use in mobile communication systems.

In addition, a diversity technology, which is an antenna switching method for switching between antennas of two systems, has been employed as a means for improving reception performance in a mobile communication system in which the location of a communication partner changes. In antenna diversity receivers of the prior art in which this diversity technology is applied in a mobile terminal of the above-described CDMA communication method, several problems have been encountered as described below.

In the TDMA (Time Division Multiple Access) method, time multiplexing allows a receiver to take advantage of vacant reception time intervals to switch between two antennas and select the antenna having better reception quality. In contrast, a receiver in a system such as the CDMA method, in which time division multiplexing is not performed, must constantly receive data throughout communication.

As a result, two methods have been adopted: one using two sets of antennas, radio receivers, and despreaders in which data that have been received by the two antennas are RAKE synthesized, and another having only two antennas in which reception switches between the two antennas even during communication to measure the reception level in the other antenna.

The first method, while providing good reception performance, is disadvantageous in that it requires two receiving systems and therefore entails increased circuit scale and current consumption. The second method requires only two antennas and one receiving system and therefore offers the advantages of small circuit scale and low current consumption. However, the second method necessitates switching between antennas during continuous reception and monitoring the level of the other antenna, and therefore has the disadvantages of deterioration of reception quality during switching and the potential for losing data. Although adjustment of the monitoring period can suppress data loss of voice data or packet data to within the permissible quality range, this solution is not preferable because the loss of communication control data, which is communication protocol information, can lead to handover delays or line disconnections.

A diversity receiver is proposed in Japanese Patent Laid-Open Publication No. H11-55168 that enables switching between antennas without deterioration in the reception characteristics by switching to the antenna having the higher received electric field intensity in time intervals in which reception of OFDM (Orthogonal Frequency Division Multiplex) signals is not necessary.

When a diversity reception technology is thus used in a communication method having time intervals in which reception is not necessary, a diversity receiver can be achieved that switches antennas without a deterioration of reception characteristics if antennas are switched in these time intervals in which reception is not necessary.

However, as noted in the foregoing explanation, in the case of a communication method that requires continuous reception such as the CDMA communication method, time intervals that are not required for reception basically do not exist, and the simple application of diversity reception technology therefore inevitably results in deterioration of reception characteristics.

The diversity receiver that is disclosed in, for example, Japanese Patent Laid-Open Publication No. 2002-300096 applies diversity transmission technology to a CDMA receiver. This diversity receiver of the prior art, however, involves the switching of transmission antennas by determining the state in which the average transmission power is at a minimum to be the best communication state, and does not involve switching of reception antennas, and therefore does not realize a diversity receiver that can switch between antennas without suffering deterioration in reception characteristics.

SUMMARY OF THE INVENTION

It is an object of the present invention to provide a diversity receiver that is capable of switching antennas without suffering a deterioration of reception characteristics even when applied to the CDMA communication method.

To achieve the above-described object, the diversity receiver according to the present invention is a diversity receiver that is provided with antennas of two systems and an antenna switch for switching between the antennas of two systems; and includes:

an A/D converter for converting a signal that is received by an antenna that has been selected by the antenna switch to a digital signal;

a despreader for despreading the digital signal from the A/D converter;

a demodulator for demodulating the signal that has undergone despreading by the despreader to realize demodulation of individual channels and a common pilot channel;

a reception level measurement unit for measuring the reception level of the common pilot channel based on the common pilot channel symbols that have undergone demodulation by the demodulator;

a TFCI bit extractor for extracting TFCI bits from individual channel symbols that have undergone demodulation by the demodulator;

a TFCI bit decoding/determination unit for decoding TFCI bits that have been extracted by the TFCI bit extractor, and based on the decoded TFCI bits, determining the presence or absence of communication control data; and an antenna switching control unit for:

checking for the presence or absence of communication control data for each fixed time interval based on the determination results of the TFCI bit decoding/determination unit, measuring the reception level of the common pilot channel at the other antenna that differs from the antenna that is currently receiving by controlling the antenna switch during intervals in which communication control data are not present to check the results of measurement of the reception level of the reception level measurement unit; and selecting the antenna in which the reception level is higher.

Alternatively, the TFCI bit decoding/determination unit may determine the presence or absence of communication control data by comparing table information that has been reported in advance with the values of the TFCI bits that have been extracted by the TFCI bit extractor.

The present invention determines TFCI (Transport Format Combination Indicator) bits that are used in a W-CDMA (Wide band CDMA) method in mobile terminals in a CDMA communication system, switches between the two receiving antennas in intervals that lack communication control data and compares the reception levels of CPICH (Common Pilot Channel) (hereinbelow referred to as the "common pilot channel") that is constantly transmitted. The present invention thus enables switching between antennas in intervals that lack communication control data and measuring reception levels, whereby antennas can be switched while preventing loss of communication control data and without bringing about deterioration in reception characteristics.

As a result, by determining TFCI bits, the present invention enables switching the receiving antenna in intervals that lack communication control data, and therefore can obtain the effect of enabling switching of antennas without losing communication control data or causing deterioration in reception performance even when applied to the CDMA communication method.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1:
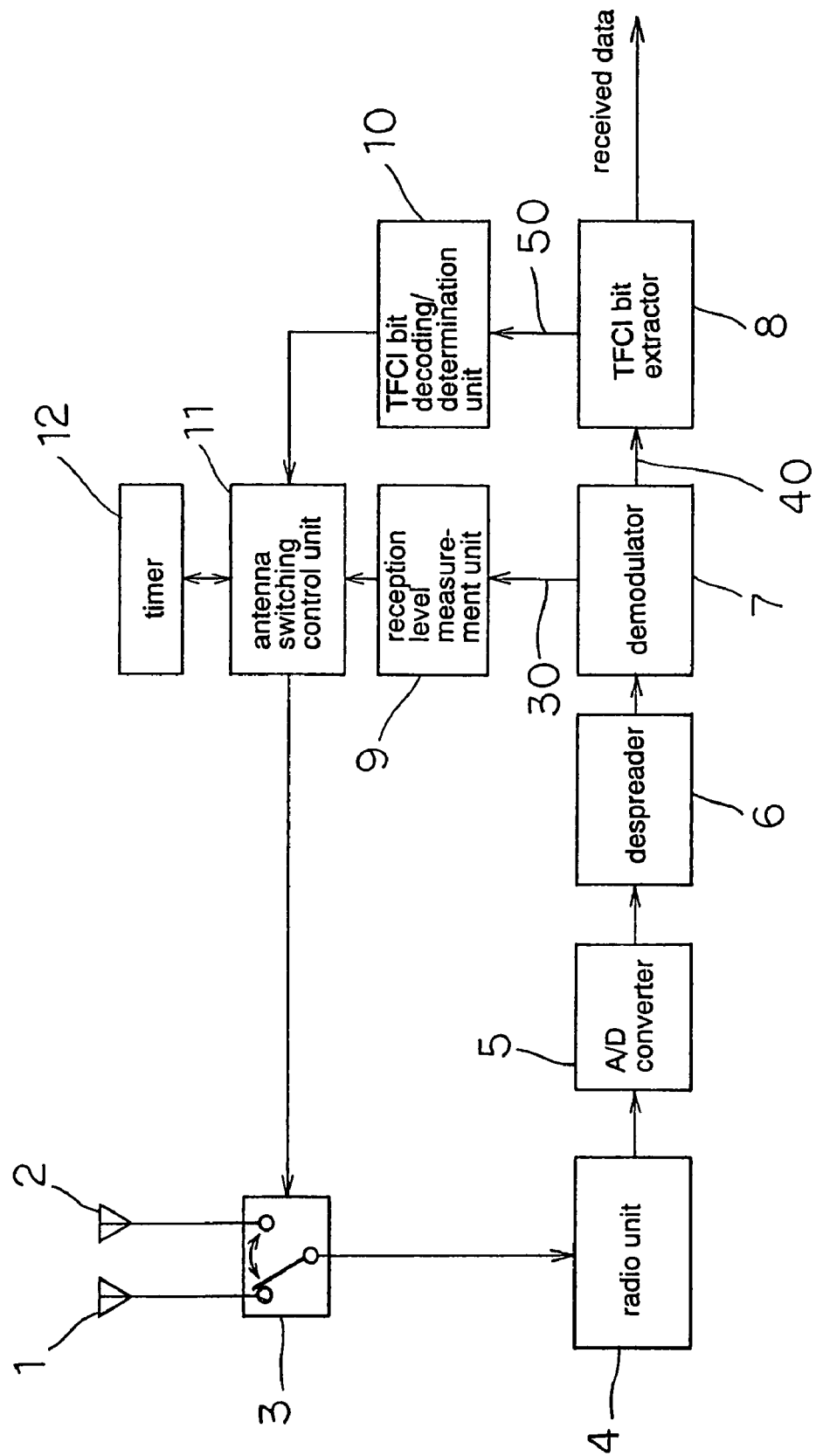
FIG. 1 is a block diagram showing the configuration of a diversity receiver according to an embodiment of the present invention.

As shown in FIG. 1, the diversity receiver according to the present embodiment is made up from: two antennas 1 and 2, antenna switch 3, radio unit 4, A/D (analog/digital) converter 4, despreader 6, demodulator 7, TFCI bit extractor 8, reception level measurement unit 9, TFCI bit decoding/determination unit 10, antenna switching control unit 11, and timer 12. Antenna switching control unit 11 may be installed in a computer (central processing unit, processor, or data processing device) that operates under the control of a program.

The two antennas 1 and 2 are switched by antenna switch 3. The signal that is received by antenna 1 or 2 is converted to a digital signal by way of radio unit 4 and A/D converter 5. The digital signal from A/D converter 5 undergoes a despreading process by despreader 6, and is then demodulated by demodulator 7. Demodulator 7 demodulates the signal that has undergone despreading by despreader 6 and thus demodulates individual channels and a common pilot channel (CCPICH).

Reception level measurement unit 9 measures the reception level of the common pilot channel based on the common pilot channel symbols 30 that have undergone demodulation by demodulator 7 and reports the measurement result to antenna switching control unit 11.

TFCI bit extractor 8 extracts TFCI bits 50 from the individual channel symbols 40 that have been demodulated by demodulator 7. TFCI bit decoding/determination unit 10 decodes TFCI bits 50 that have been extracted by TFCI bit extractor 8 and determines the presence or absence of communication control data based on the decoded TFCI bits. TFCI bit decoding/determination unit 10 then reports the determination results to antenna switching control unit 11.

Antenna switching control unit 11 uses timer 12 to check for each fixed time interval for the presence or absence of communication control data based on the reports from TFCI bit decoding/determination unit 10. By controlling antenna switch 3 in those intervals that lack communication control data, antenna switching control unit 11 measures the reception level of the common pilot channel at the other antenna that differs from the antenna that is currently receiving and then selects the antenna having the higher reception level.

This capability to switch between antennas in intervals that lack communication control data and then compare the reception levels of the two antennas as described above allows the realization of a stable antenna-selecting diversity receiver.

The communication control data here described refers not to speech data or packet data but to control information that is used for communication protocol control such as handovers. More specifically, "communication control data" refers to the data that are exchanged between a base station and a terminal at the time of call control such as call origination and termination from a portable terminal and movement from base station to base station (handover). Communication control data are the data that are assigned to the DCCH (Dedicated Control Channel) that is described in TS25.321 in 3GPP. Data such as speech data and packet data, on the other hand, are assigned to DTCH (Dedicated Traffic Channels).

Figure 2:
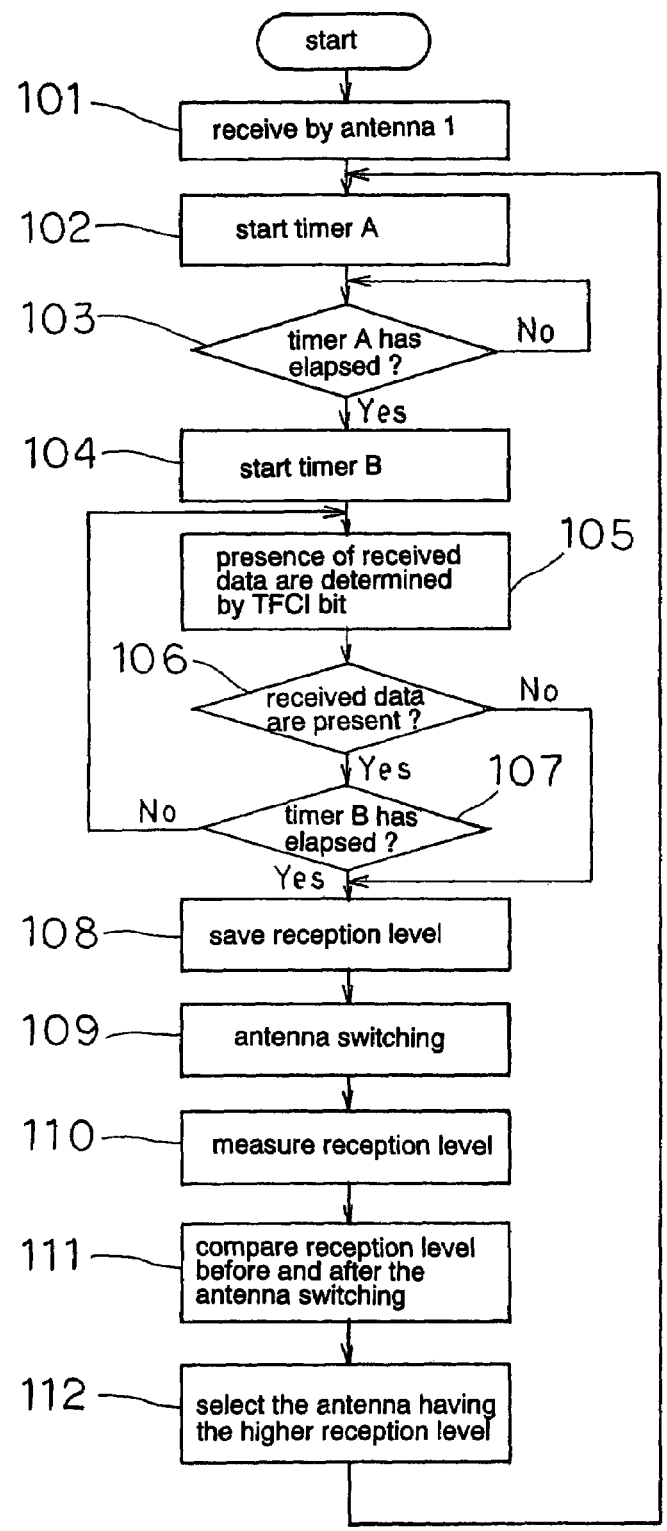
FIG. 2 is a flow chart showing the operation of the diversity receiver of FIG. 1.

Explanation next regards the details of the operation of the diversity receiver of the present embodiment with reference to the flow chart of FIG. 2.

When initiating communication, antenna switching control unit 11 controls antenna switch 3 to select antenna 1 in step 101. The initial step may also begin with antenna 2, or may start with the antenna that had the higher receiving level in the preceding communication.

In step 102, antenna switching control unit 11 sets fixed time interval A that has been determined in advance in timer 12 and starts the timer.

Antenna switching control unit 11 then refrains from switching antennas until timer 12 reports that fixed time interval A has elapsed in step 103.

When timer 12 reports that fixed time interval A has elapsed, antenna switching control unit 11 sets fixed time interval B that has been determined in advance and starts timer 12 in step 104.

In step 105, during the interval up to the timing out of timer B, TFCI bits are extracted by TFCI bit extractor 8, the presence or absence of communication control data is determined by TFCI bit decoding/determination unit 10, and the results of determination are reported to antenna switching control unit 11.

If TFCI bit decoding/determination unit 10 determines that communication control data are present in step 106, antenna switching control unit 11 determines whether timer 12 has reported the passage of fixed time interval B, and if timer B has not timed out, the operation is repeated from step 105.

When timer B has timed out, or when it is determined that there are no communication control data, antenna switching control unit 11, in step 108, saves the reception level of the common pilot channel that was reported from reception level measurement unit 9 immediately before antenna switching.

Antenna switching control unit 11 notifies antenna switch 3 in step 109 to switch antennas 1 and 2. When timer B has timed out, the antennas are switched even when there are communication control data, but because communication control data are not continuously transmitted in actual use, it is possible to reduce the frequency of switching of the antennas when there are data by appropriately setting the predetermined value of timer B.

Reception level measurement unit 9 uses the common pilot channel symbols of the signal that was received by antenna 1 or antenna 2 that has been switched to measure the reception level and notifies antenna switching control unit 11 in step 110.

Antenna switching control unit 11 compares the reception level before and after the antennas were switched in step 111.

Antenna switching control unit 11 selects the antenna having the higher reception level in step 112 and reports the antenna that is to be used to antenna switch 3.

The process subsequently returns to step 102 and this operation is repeated during communication.

Figure 3:
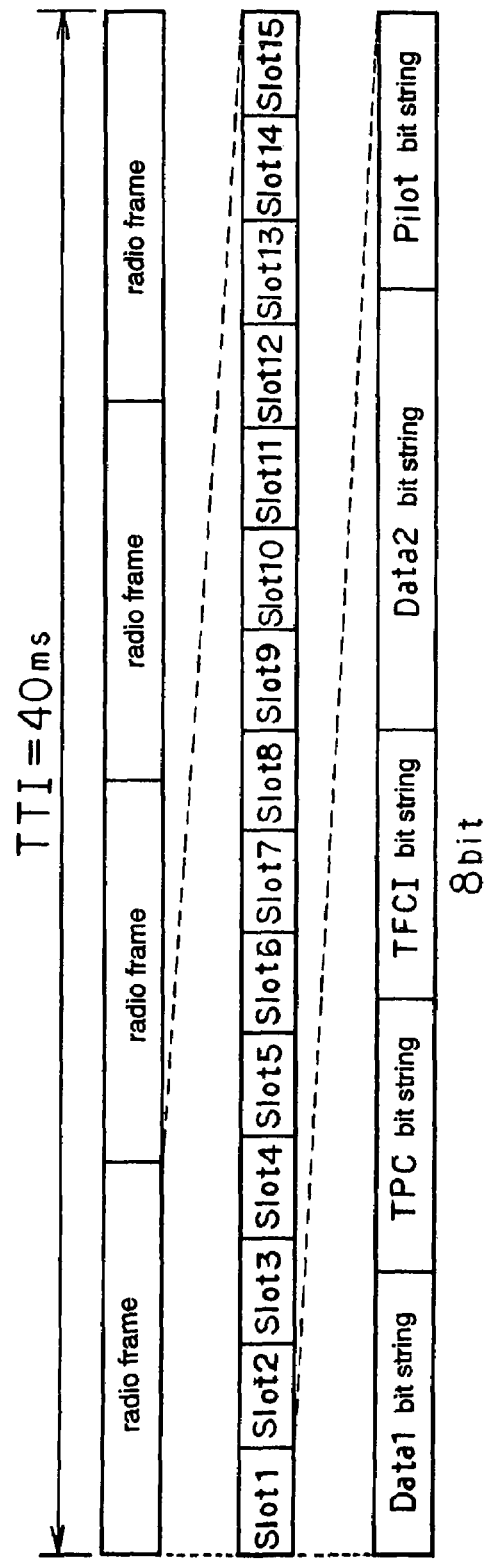
FIG. 3 shows an example of the arrangement of TFCI bits.

Based on FIG. 3, explanation next regards an example of the arrangement, decoding method, and timing of determination of TFCI bits in individual channels in 3GPP ($3^{rd}$ Generation Partnership Project), which is the standardized specification. For the purpose of explanation, the specific parameters in FIG. 3 are assumed in the explanation, but the number of TFCI bits and the TTI (Transmission Time Interval) may be other values.

FIG. 3 shows an example for a case in which TTI is 40 ms, this TTI interval being a decoding unit of a single item of received data. TTI is composed of a single radio frame or a plurality of radio frames. A radio frame is composed of fifteen radio slots, for example, eight bits of TFCI bits being arranged in each slot. Data 1 and 2 are data sequences, and a bit pattern already known to the mobile unit is inserted beforehand in the pilot bit string. The TPC (Transmission Power Control) bit string is used in inner-loop transmission power control. TPC and the pilot bit string are not directly related to the present invention and a detailed explanation is therefore here omitted.

Thirty-two bits of the above-described TFCI bits make up a TFCI code word. TFCI bit decoding/determination unit 10 then compares the table information that has been communicated beforehand with the values of TFCI bits 50 that have been extracted by TFCI bit extractor 8 and is thus able to obtain information on the presence or absence of speech data, packet data, or communication control data and information on the data size. In this case, the table information is designated to a mobile unit from the network and includes information that indicates the presence of communication control data when the TFCI bits are a particular value and indicates the absence of communication control data in the case of a particular value.

To improve reception characteristics, the decoding of TFCI bits typically employs a maximum-likelihood determination and not the above-described determination, but since these methods do not relate directly to the present invention and the operator will know a number of methods, explanation is here omitted.

In the example of FIG. 3, since eight TFCI bits are allotted to one slot, 8×15×4=480 bits exist within one TTI (40 ms), but in this case, a TFCI code words of 32 bits are repeatedly received. Thus, TFCI can be decoded by taking the common-mode addition of the first 32 bits or the first several TFCI codes that are repeated.

For example, TFCI code words are decoded using only the TFCI bits that are present in the first radio frame interval of a TTI=40 ms interval, and the presence or absence of communication control data is determined. If it is here determined that data are not present, the antennas can be switched during the remaining three frames, the reception level of the common pilot channel measured, and a determination made regarding which antenna has the higher reception level.

By means of the above-described operation, even when antennas are switched and the reception level of the switched antenna is low, communication control data tend not to be lost, and disconnection of communication due to data resending or delays in handover time are eliminated. As a result, a stable antenna switching diversity receiver can be realized.

In addition, the diversity receiver of the present embodiment enables the realization of diversity receiver by means of an antenna-switching method that requires only one receiver system and two systems only for antennas, even in a CDMA system that requires continuous reception, and the present embodiment therefore enables a reduction of circuit scale.

Although TFCI code words were used to determine only the presence or absence of communication control data in the present embodiment, the present invention is not limited to this form and permits the similar use of TFCI code words to determine intervals that lack packet data, intervals having few data items, or silent intervals of speech data and then implement antenna switching.

While a preferred embodiment of the present invention has been described using specific terms, such description is for illustrative purposes only, and it is to be understood that changes and variations may be made without departing from the spirit or scope of the following claims.

What is claimed is:

1. A diversity receiver that is provided with antennas of two systems and an antenna switch for switching between said antennas of two systems; said diversity receiver comprising:
    an A/D converter for converting a signal that is received by an antenna that has been selected by said antenna switch to a digital signal;
    a despreader for despreading the digital signal from said A/D converter;
    a demodulator for demodulating the signal that has undergone despreading by said despreader to realize demodulation of individual channels and a common pilot channel;
    a reception level measurement unit for measuring the reception level of the common pilot channel based on the common pilot channel symbols that have undergone demodulation by said demodulator;
    a TFCI bit extractor for extracting TFCI bits from individual channel symbols that have undergone demodulation by said demodulator;
    a TFCI bit decoding/determination unit for decoding TFCI bits that have been extracted by said TFCI bit extractor, and based on the decoded TFCI bits, determining the presence or absence of communication control data; and an antenna switching control unit for:
  checking for the presence or absence of communication control data for each fixed time interval based on the determination results of said TFCI bit decoding/determination unit,
  measuring the reception level of the common pilot channel at the other antenna that differs from the antenna that is currently receiving by controlling the antenna switch during intervals in which communication control data are not present to check the results of measurement of the reception level of said reception level measurement unit; and
  selecting the antenna in which the reception level is higher.

2. A diversity receiver according to claim 1, wherein said TFCI bit decoding/determination unit determines the presence or absence of communication control data by comparing table information that has been reported in advance with the values of TFCI bits that have been extracted by said TFCI bit extractor.

3. An antenna switching control method for, in a diversity receiver that is provided with antennas of two systems and an antenna switch for switching between said antennas of two systems, controlling switching to the antenna of said antennas of two systems that has the better reception state; said antenna switching control method comprising steps of:
  converting a signal that is received by an antenna that has been selected by said antenna switch to a digital signal and then performing demodulation of the signal that has undergone despreading to realize demodulation of individual channels and a common pilot channel;
  measuring the reception level of the common pilot channel based on said common pilot channel symbols that have been demodulated;
  extracting TFCI bits from said individual channel symbols that have undergone demodulation;
  decoding said TFCI bits that have been extracted and determining the presence or absence of communication control data based on TFCI bits that have been decoded; and
  checking for the presence or absence of communication control data for each fixed time interval based on said determination results, measuring the reception level of the common pilot channel at the other antenna that differs from the antenna that is currently receiving by controlling said antenna switch during intervals in which communication control data are not present to check the results of measurement of the reception level of said common pilot channel, and selecting the antenna in which the reception level is higher.

4. An antenna switching control method according to claim 3, wherein, in the step of determining the presence or absence of communication control data based on TFCI bits that have been decoded, the presence or absence of communication control data is determined by comparing table information that has been reported in advance with the values of said TFCI bits that have been extracted.

* * * * *